Figure 1:
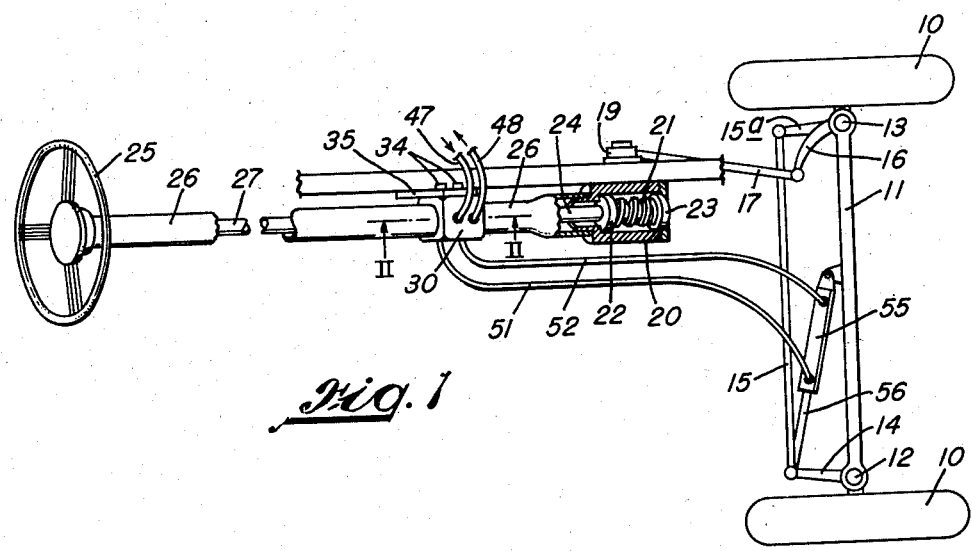

March 11, 1958    C. B. LIVERS    2,826,258
VALVE AND VALVE-ACTUATING MECHANISM FOR
HYDRAULIC STEERING SYSTEM
Original Filed Feb. 26, 1953

INVENTOR.
C. B. Livers
BY
ATTORNEY

United States Patent Office 2,826,258
Patented Mar. 11, 1958

2,826,258

VALVE AND VALVE-ACTUATING MECHANISM FOR HYDRAULIC STEERING SYSTEM

Carlos B. Livers, North Hollywood, Calif., assignor to Bendix Aviation Corporation, South Bend, Ind., a corporation of Delaware Continuation of application Serial No. 339,033, February 26, 1953. This application August 31, 1955, Serial No. 531,745

10 Claims. (Cl. 180—79.2)

This invention relates to hydraulic power steering boost on vehicles employing a conventional steering wheel and shaft for manual control.

This application is a continuation of my copending application Serial No. 339,033, filed February 26, 1953, now abandoned.

An object of the invention is to provide a simple and effective method of actuating the valve of a hydraulic steering motor in response to the resistance to manual steering.

Another object is to provide a steering valve mechanism that is insertable in the rotatable steering shaft of a conventional manual steering gear.

Other more specific objects and features of the invention will appear from the description to follow.

In one well known system for power steering of automobiles and the like, a conventional worm and sector manual steering gear is employed in which axial reactive movement of the steering shaft in response to rotation thereof is used to actuate the hydraulic valve controlling the power-assisted motor. Since axial reaction of the steering shaft is inherent in a worm and sector type of gear, its utilization has the advantage of eliminating the need of a separate mechanism for producing linear valve movement in response to rotary movement. It has the disadvantage of being inapplicable to steering gears of types that do not produce a linear reaction thrust in the steering shaft. Furthermore it must be incorporated as an integral part of the steering gear since the latter must be designed to permit the necessary end play in the steering shaft.

In accordance with the present invention I do not alter the manual steering gear box in any respect and its adjustment is preferably such as to eliminate all end play in the steering shaft. I simply break the steering shaft at any convenient point between the gear box and the wheel and interpose the piston element of the valve therebetween as a connecting link. One end of the piston element is coupled to the steering wheel end of the shaft for rotation therewith. The other end of the piston element is connected to the steering box end of the shaft by a screw mechanism, so that steering torque imparts an axial valve-actuating thrust to the valve piston. Further in accordance with the invention, the axial movement of the valve piston is limited by hydraulic fluid acting against pressure surfaces of the piston. When the valve has moved sufficient to apply the necessary pressure to the motor to give the desired power assist, the reactive force of the fluid against the thrust faces of the piston prevents further movement thereof, so that thereafter the screw mechanism simply transfers rotary motion of the steering wheel end of the shaft to the steering box end of the shaft. The hydraulic thrust on the piston of the valve acts as a frictionless thrust bearing permitting substantially free rotation of the piston despite the end thrust applied thereto by the screw mechanism.

Figure 2:
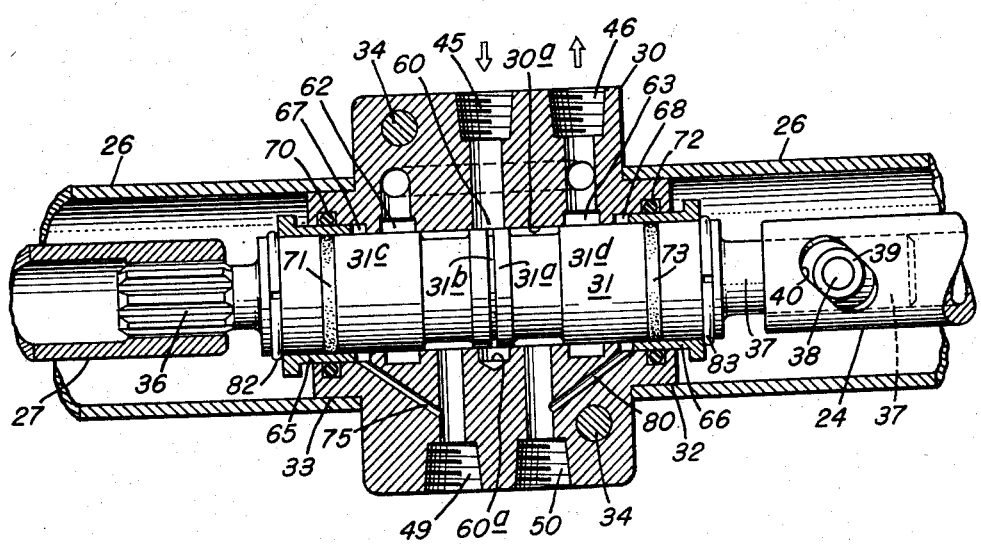

A full understanding of the invention may be had from the following detailed description when read in connection with the drawing, in which:

Figure 1 is a schematic view in plan of a conventional steering mechanism of a vehicle modified in accordance with the present invention; and Figure 2 is a longitudinal section through the steering valve, the view being taken in the plane II—II of Figure 1.

Referring first to Figure 1 there is shown a conventional steering system such as may be used on an automobile.

Thus there is shown a pair of front wheels 10 which are connected to an axle 11 by a pair of steering knuckles 12 and 13 respectively. The knuckle 12 has one rearwardly extending arm 14 which is connected by a cross rod 15 to a corresponding arm 15a on the knuckle 13. Knuckle 13 has a steering arm 16 which is connected by a drag link 17 to the end of a pitman arm 19 of a conventional steering box 20. This box 20 contains a worm 21 which meshes with a sector (not shown) on an output shaft on which the pitman arm 19 is secured. The worm 21 is supported in the box 20 by suitable thrust bearings 22 and 23 at opposite ends thereof which positively prevent any axial movement of the worm 21 while permitting free rotation thereof. The worm 21 is solidly secured to the lower end 24 of an input shaft which in an ordinary manual steering installation would extend to a steering wheel 25 at the upper end of a steering column 26. However in the present invention the steering shaft is broken into two sections, the lower section 24 of which constitutes the input shaft connected to the worm 21 as described, and the upper section of which constitutes the steering shaft 27, connected to the steering wheel 25.

Referring to Figure 2 the steering mast 26 is broken and there is interposed between the two sections thereof a stationary valve element 30 which constitutes a cylinder member defining a cylinder 30a in which a piston member 31 is rotatable and reciprocable.

The cylinder member 30 may have flanges 32 and 33 at opposite ends thereof for engaging the two sections of the steering mast 26. In addition, the cylinder member 30 may be secured as by cap screws 34 (Figure 1) to an anchor plate 35 forming a part of the vehicle frame, so that the cylinder member 30 is held rigidly against movement in any direction.

The piston member 31 has a splined extension 36 at its left end which is engaged by corresponding splines on the lower end of the steering shaft 27, the latter being in the form of a hollow tube. The right end of the piston member 31 is constituted by an extension 37 cylindrical in shape which fits within the end of the hollow input shaft 24 extending from the gear box 20. This extension 37 has a cross pin 38 therein on opposite ends of which there are mounted rollers 39 which engage in oppositely inclined slots 40 in the hollow shaft 24. The cam mechanism consisting of the rollers 39 and the slots 40 is a form of screw mechanism and will sometimes be referred to as such. It will be obvious that rotation of the extension 37 in one direction develops an axial thrust in one direction between the extension 37 and the input shaft 24 and develops a thrust in the opposite direction in response to rotation in the opposite direction. As previously indicated, the input shaft 24 is prevented from moving axially by the thrust bearings 22 and 23 in the steering box. Therefore any resistance to relative rotation between the piston member 31 and the input shaft 24 develops a thrust tending to move the piston member 31 in one direction or the other.

The cylinder member 30 is provided with a pressure inlet passage 45 and a return passage 46 which may be connected by suitable hoses 47 and 48 (Figure 1) to a pump (not shown). The cylinder member 30 also has a pair of cylinder passages 49 and 50 respectively which are connected by hoses 51 and 52 respectively to the opposite ends of a motor cylinder 55 which is anchored at one end to the axle 11 and has a piston rod 56 extending from the other end and connected to the steering arm 14. If pressure fluid is admitted through the hose 52 and fluid is released from the hose 51, a piston within the motor 55 tends to project the piston rod 56 therefrom, to steer the wheels 10 to the left. Vice versa, pressure fluid in hose 51 tends to draw the piston rod 56 into the cylinder 55 and thereby steer the wheels 10 to the right.

Referring again to Figure 2, the pressure passage 45 terminates in a port 60 in the cylinder 30a which port is normally closed by a land 31a on the piston member 31. This land 31a may have a pressure equalizing groove 31b therein, and a blind port 60a may be provided in the cylinder member opposite the port 60 to equalize pressure thrusts on the land 31a.

The return port 46 is connected to two annular ports 62 and 63 in the cylinder 30a which are disposed in spaced relation on the opposite sides of the pressure port 60. These ports 62 and 63 are normally covered by lands 31c and 31d, respectively, of the piston member 31.

It will be observed from the foregoing that movement of the piston member 31 to the left will admit pressure fluid past the right edge of land 31a to the cylinder port 50 and thence to the anchored end of the motor cylinder 55 (Figure 1). At the same time, the other end of the motor cylinder will be connected through the hose 51 and the port 49 with the return port 62 which will be uncovered by the land 31c. Movement of the piston in the opposite direction (to the right) will admit pressure fluid from the port 60 past the left edge of the land 31a to the port 49 and the port 50 will be connected past the left edge of the land 31d with the return port 63.

It will be observed that opposite ends of the cylinder 30a are counterbored and that the piston 31 is provided with bushings 65 and 66 which project into the counterbores and define therewith annular pressure chambers 67 and 68. These pressure chambers are fluid sealed by O-rings or other gaskets 70 and 72 sealing against the outer surfaces of the bushings 65 and 66, and rings 71 and 73 sealing against the inner surfaces thereof.

The chamber 67 is connected by a duct 75 to the motor port 49, and the pressure chamber 68 is connected by a duct 80 to the motor port 50. The bushings 65 and 66 are prevented from moving outwardly on the piston member 31 by retaining rings 82 and 83, respectively.

The system described operates as follows:

Let it be assumed that the steering wheel 25 is rotated clockwise to steer the road wheels 10 to the right. As a result of the resistance to movement of the front wheels, the rollers 39 of the screw mechanism tend to ride forwardly in the slots 40 thereby shifting the piston member 31 forwardly or to the right. This causes the left edge of the land 31a to clear the pressure port 60 and admit pressure fluid to the motor port 49. Pressure fluid therefore flows through the port 49 and the hose 51 into the free end of the motor cylinder 55 tending to contract the piston rod 56 into the motor and thereby aid the steering gear in steering the wheels 10 to the right.

It will be noted that since the motor passage 49 is connected by the duct 75 to the chamber 67, whatever pressure is existent in the motor port 49 is also present in the chamber 67 and acts against the right end of the bushing 65 tending to urge the piston member 31 to the left which is opposite to the direction in which it is being urged by the screw mechanism. The greater the opening (rightward) movement of the piston 31, the greater will be the pressure in the port 49 and in the chamber 67, so that the rising pressure in the chamber 67 limits the extent of movement of the piston to a value determined by the pressure in the motor cylinder 55 required to move the road wheels 10. If the vehicle is in motion and only a relatively low pressure is required in the motor 55 to steer the wheels, then only a slight torque applied to the steering wheel 25 will be required. On the other hand if there is greater resistance to steering movement of the road wheels then greater pressure of fluid in the motor 55 will be required, with resultant higher pressure in the port 49 and in the chamber 67, and the operator will have to apply a greater torque to the steering wheel 25 in order to overcome the pressure in chamber 67 and open the valve to the desired extent. Hence it will be seen that the system provides a reaction or "feel" at the steering wheel that is proportionate to the resistance to steering of the road wheels.

It is to be understood that usually in steering systems of this type there is a pressure available in the pressure port 45 higher than any pressure that would ever be required in the motor cylinder 55, so that the pressure delivered to the motor and delivered to the reaction chambers 67 and 68 depends entirely on the extent to which the piston member 31 is shifted longitudinally. As the piston is shifted out of neutral position, the pressure rapidly increases in the appropriate one of the reaction chambers 67 and 68 to limit the movement.

It will be noted that during rotation of the worm 21 by the steering wheel 25, through the linkage involving the steering wheel shaft 27, the piston member 31, the screw mechanism involving the rollers 29 and the slots 40, and the input shaft 24, there will always be a longitudinal thrust between the piston member 31 and the steering shaft 24. However this thrust does not introduce any great amount of rotational friction. The thrust bearings 22 and 23 in the steering box 20 are conventionally anti-friction bearings. Furthermore the thrust on the piston member 31 is taken entirely by liquid in one of the reaction chambers 67 or 68, which liquid offers negligible resistance to rotation of the piston member 31.

The operation has been described in detail only with reference to steering movement in one direction. However it will be obvious from the symmetrical construction of the mechanism that exactly the same mode of operation is effective in the opposite direction, the only difference being that when the steering wheel 25 is turned counterclockwise, the screw mechanism shifts the piston member 31 upwardly or to the left, and a pressure is developed in the reaction chamber 68 to oppose this motion.

Although for the purpose of explaining the invention, a particular embodiment thereof has been shown and described, obvious modifications will occur to a person skilled in the art, and I do not desire to be limited to the exact details shown and described.

I claim:

1. In mechanism of the class described, a sectionalized compound steering column having a steering shaft therein arranged to exert torque on a steering linkage assembly, said steering shaft including first and second sections fixed against axial movement and a third section interposed axially between said first and second sections, said third section being connected to said first section in a manner to provide axial movement of the third section with respect to said first section and connected to said second section in a manner to provide rotational and axial movement of said third section with respect to said second section, a cylinder interposed between two of the sections of the steering column, said cylinder providing a housing for said third section of said shaft and equipped with inlet, outlet and two motor ports, and a remote controlled hydraulic motor removed from said steering column and operatively connected to the steering linkage assembly and in communication with the motor control ports of said cylinder, said third section of the shaft comprising a cylindrical piston element controlling fluid flow through said motor ports for actuating said hydraulic motor to provide power assisted steering.

2. In a vehicle incorporating mechanism of the type utilizing hydraulic power to assist steering, the combination of a compound steering column having a compound steering shaft therein arranged to exert turning torque to a steering linkage assembly, said steering shaft consisting of a first section reciprocable in a second section; said first section being reciprocable and rotatable in a third section and a cylinder interposed in said steering column and adapted to be secured to a vehicle frame, said second section and steering column being operatively connected to a manually actuated steering means, said third section operatively connected to a worm gear in a steering box on said steering column containing thrust bearings rotatably supporting the worm gear which is retained therein against axial movement and adapted to transmit turning torque to the steering linkage assembly; said cylinder comprising a stationary valve control element including fluid inlet, outlet and motor ports, a remote controlled hydraulic motor removed from said steering column and operatively connected to the steering linkage assembly, and in communication with the motor control ports of the valve control element; said first section comprising a piston element controlling fluid flow through said valve ports for actuating said controlled motor to provide power assisted steering; said piston element and valve control element including means providing a reaction to the manually actuated steering means apprising the operator of the power assisted torque supplied to the steering linkage.

3. In a combination as set forth in claim 1 above wherein there is included between the second and third sections of the steering shaft cam means causing rotation and axial movement of said third section with respect to the second section when torque is applied to the steering shaft.

4. In a combination as set forth in claim 1 above wherein said cylinder and said third shaft section are provided with fluid pressure means connecting with one of said motor ports and constructed and arranged to oppose the axial movement of said third shaft section which permits pressure fluid to enter said one of said motor ports.

5. In a combination as set forth in claim 1 above wherein said cylinder and said third shaft section are provided with fluid pressure means connecting with one of said motor ports and constructed and arranged to oppose the axial movement of said third shaft section which permits pressure fluid to enter said one of said motor ports whereby fluid pressure absorbs the thrust produced by the connection between said second and third shaft sections.

6. In a combination as set forth in claim 1 above wherein said cylinder includes communicating passages between the motor ports and a portion forming a part of a reaction chamber in said cylinder and said piston element includes a land portion which includes hydraulic fluid balancing means and means thereon forming the other part of said reaction chamber.

7. In a combination as set forth in claim 2 above wherein the remote controlled hydraulic motor removed from said steering column is operatively secured between an axle and an extending arm of the steering linkage assembly.

8. In a vehicle incorporating mechanism of the type utilizing hydraulic power to assist steering, the combination of a steering linkage including steerable wheels connected to an axle by steering knuckles, extending arms connected to said steering knuckles, a cross-rod connecting said arms, a steering arm operatively connected at one end to one of said steering knuckles and at the other end to a drag link secured to a pitman, said pitman being operatively secured to a steering box containing thrust bearings rotatably supporting a worm gear retained therein against axial movement and operative to transmit steering torque to said drag link; a steering column having a manually actuated steering wheel operatively secured thereon; said steering column having a compound steering shaft therein, operatively secured to said steering wheel and worm gear consisting of a first section reciprocable in a second section; the first section being reciprocable and rotatable in a third section and a cylinder interposed in said steering column and adapted to be secured to a vehicle frame; said cylinder member comprising a stationary valve control element including fluid inlet, outlet and motor control ports; said first section comprising a piston element controlling fluid flow through said valve ports, a remote controlled hydraulic motor removed from said steering column operatively secured between the axle and one of said extending arms actuated by fluid flow from said stationary valve member controlled by said piston element; said stationary valve member and piston element including therebetween variable volume reaction chambers consisting of relatively reciprocable parts thereon; said reaction chamber being in communication with said motor control ports whereby movement of the piston element from a neutral position in the valve element due to torque applied to the steering wheel results in an increase in pressure in one reaction chamber and a decrease in the other providing a reaction at the steering wheel proportional to the amount of applied torque for a given steering condition.

9. In a combination as set forth in claim 8 wherein there is included between the first and third sections of the steering shaft cam means causing rotation and axial movement of said first section with respect to the third section when torque is applied to the steering shaft.

10. In a combination as set forth in claim 8 wherein said valve element includes communicating passages between the motor control ports a portion forming part of said reaction chamber and said piston element includes a land portion which includes hydraulic fluid balancing means and means thereon forming the other part of said reaction chamber.

References Cited in the file of this patent

UNITED STATES PATENTS

| 1,467,209 | Sumner | Sept. 4, 1923 |
| 2,213,271 | Davis | Sept. 3, 1940 |
| 2,608,263 | Garrison | Aug. 26, 1952 |